(12) United States Patent
Wallentin

(10) Patent No.: US 6,233,222 B1
(45) Date of Patent: May 15, 2001

(54) TELECOMMUNICATIONS INTER-EXCHANGE CONGESTION CONTROL

(75) Inventor: Bo Stefan Pontus Wallentin, Ljungsbro (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/035,788

(22) Filed: Mar. 6, 1998

(51) Int. Cl.[7] .................................................. H04J 3/02
(52) U.S. Cl. ................................................ 370/229
(58) Field of Search ................................ 370/229–236, 370/352, 389, 395, 311, 329, 323, 333, 345, 465, 254, 252, 468, 310, 318, 332; 455/13.4, 428, 436, 516, 517, 560, 561, 570

(56) References Cited

U.S. PATENT DOCUMENTS 5,327,576 * 7/1994 Uddenfeldt et al. .................. 370/333
5,515,359 * 5/1996 Zheng .................................. 370/231

FOREIGN PATENT DOCUMENTS

| WO 95/08898 | 3/1995 | (WO) . |
| WO 95/15665 | 6/1995 | (WO) . |
| WO 95/20865 | 8/1995 | (WO) . |
| 97/41698 | 11/1997 | (WO) . |

OTHER PUBLICATIONS

Cheung, et al, "Network Configurations for Seamless Support of CDMA Soft Handoffs Between Cell–Clusters", Dept. of Electrical Engineering, The University of British Columbia, 0–7803–3300–4/96 ©1996, pp. 295–299.

Jones, et al., IS–634 revision A—part 1 (IS–634.1 rev A) (PN–3539) 2nd Ballot Version—Draft for V&V, Part 1—Common Protocol and Part 5—Protocol Details, Oct. 27, 1997.

"Digital Cellular Telecommunications System (Phase 2+); Mobile Application Part (MAP) Specification (GSM 09.02 version 5.8.0)", European Telecommunications Standard Institute; Draft pr ETS 300 974, Feb. 1998.

"Cellular Radiotelecommunications Intersystem Operations", ANSI–41–D (Former (TIA/EIA IS–41–C), pp. 2–5–2–14, 2–25–2–30.

Simmons et al., "Switching Handovers in Microcellular Mobile Networks: An Architectural Evolution", Proceedings of the International Switching Symposium, Yokohama, Oct. 25–30, 1992, vol. 1, No. SYMP. 14, Oct. 25, 1992, pp. 108–112, XP000337626 Institute of Electronics; Information and Communication Engineers.

* cited by examiner

Primary Examiner—Dang Ton
(74) Attorney, Agent, or Firm—Nixon & Vanderhye, P.C.

(57) ABSTRACT

A telecommunications network has a target exchange (RNC $222_2$) which determines a congestion condition in a region supervised by the target exchange, and which sends a congestion message to a source exchange (RNC $222_1$). The source exchange controls at least some connections which utilize radio resources in the region supervised by the target exchange. The congestion message causes the source exchange to adjust at least one connection which it controls in the region supervised by the target exchange. In a first mode of the invention, the target exchange determines a selected connection to be adjusted in view of the congestion condition. In this first mode, the congestion message identifies the selected connection to be adjusted and further includes an adjustment value (e.g., power reduction value) for the selected connection to be adjusted. In a second mode of the invention, the congestion message includes an identification of a congested area (e.g., a cell) within the region supervised by the target exchange, as well as a severity value indicating a severity of the congestion in the congested area. The severity value can be indicative of a needed decrease in congestion in the congested area.

20 Claims, 11 Drawing Sheets

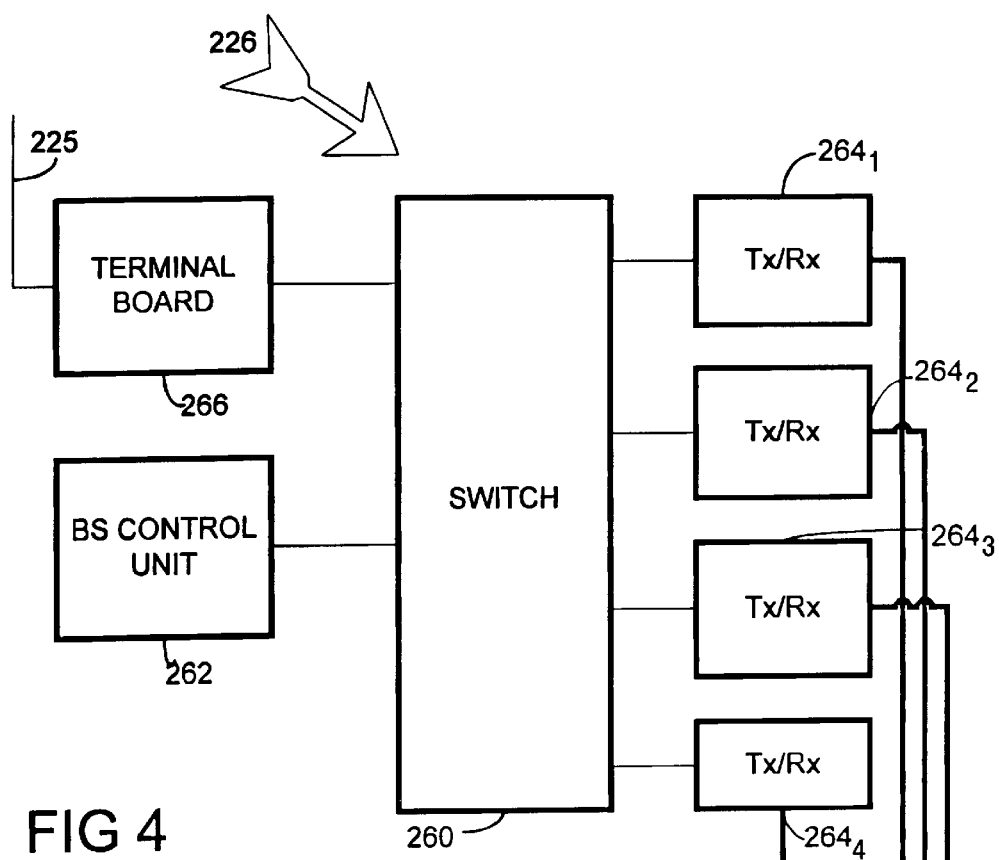
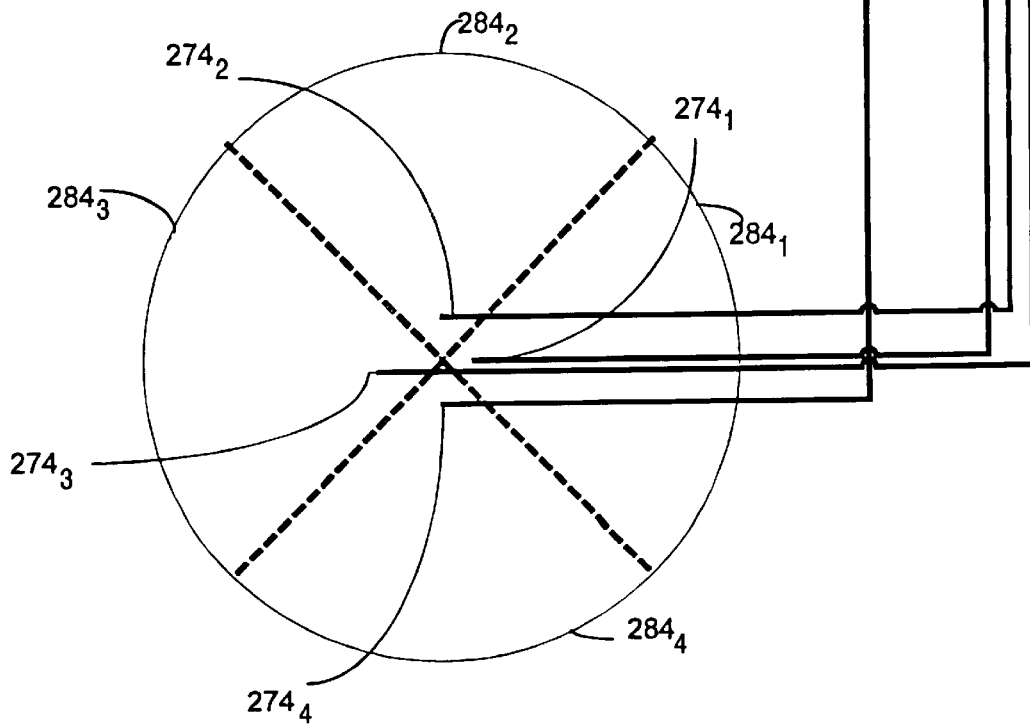
FIG 4

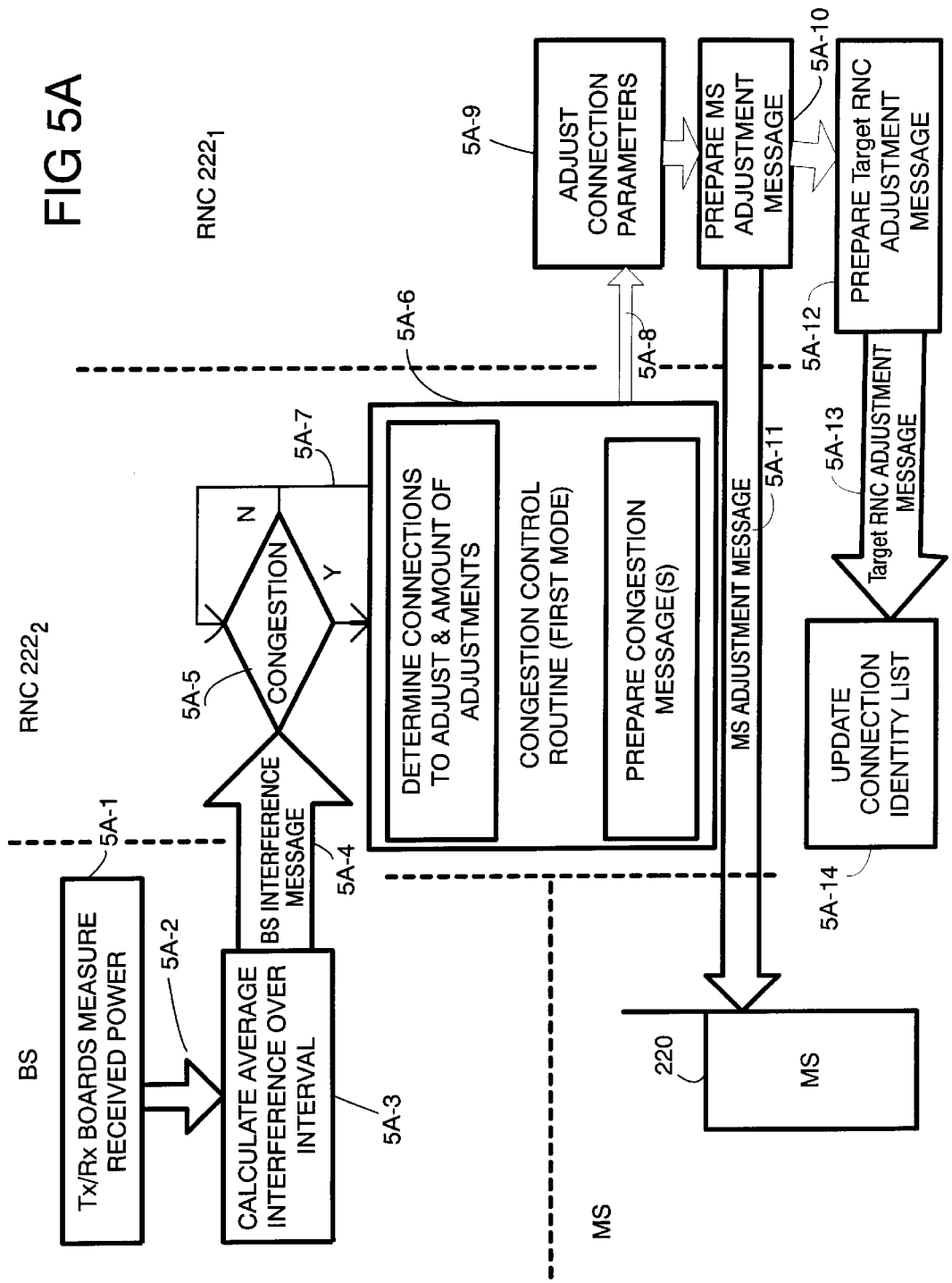

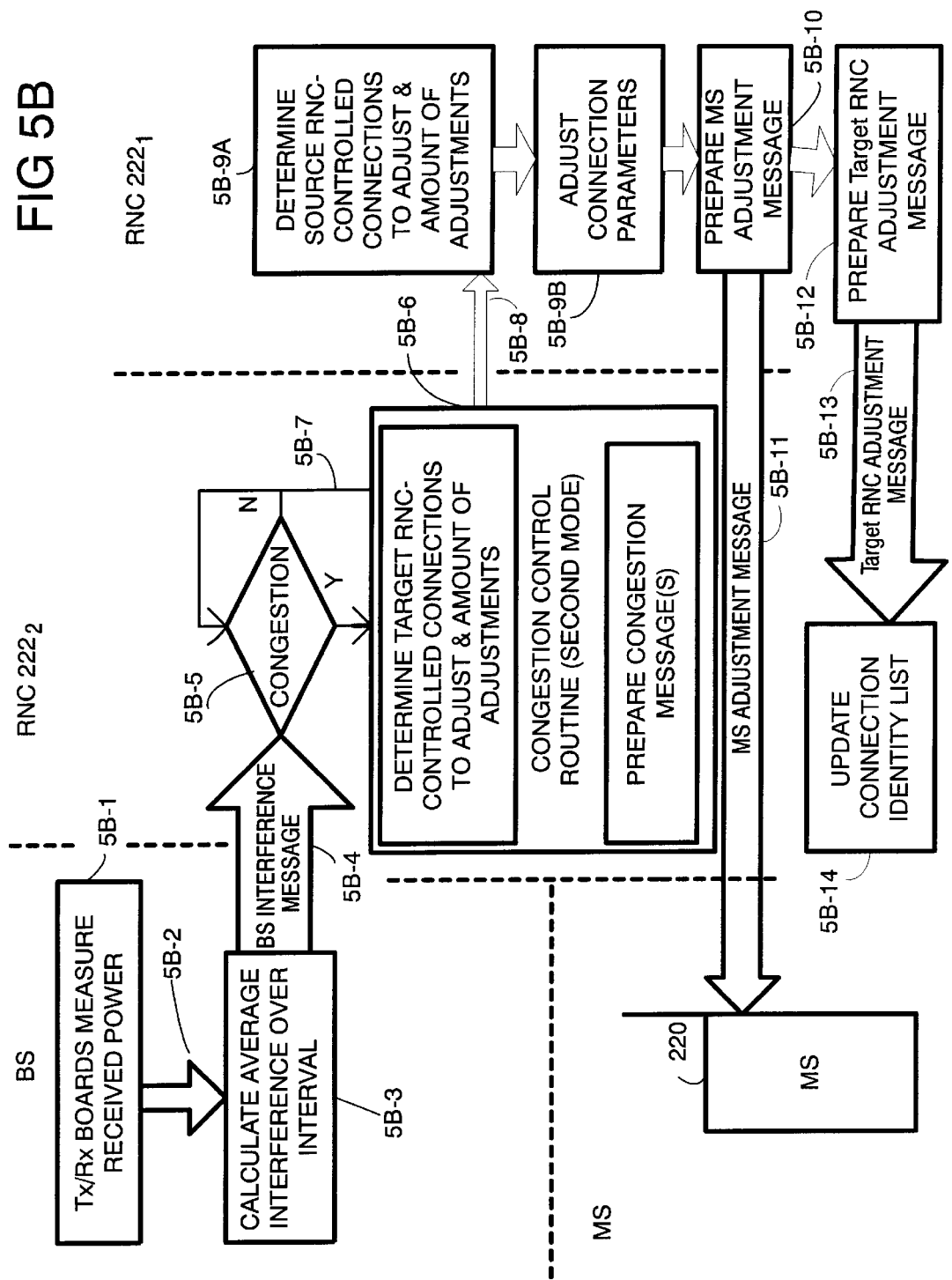

BS INTERFERENCE
MESSAGE

CONGESTION MESSAGE
(MODE 1)

CONGESTION MESSAGE
(MODE 2)

FIG 9
CONNECTION IDENTITY LIST

| CONNECTION ID | SOURCE RNC | BITRATE | OTHER PARAMETERS |
|---|---|---|---|
|  |  |  |  |
|  |  |  |  |
|  |  |  |  |

FIG 10
CONNECTION VIA TARGET RNC IDENTITY LIST

| CONNECTION ID | TARGET RNC | CELL ID | BITRATE | BIT ERROR RATE | DELAY |
|---|---|---|---|---|---|
|  |  |  |  |  |  |
|  |  |  |  |  |  |
|  |  |  |  |  |  |

TELECOMMUNICATIONS INTER-EXCHANGE CONGESTION CONTROL

This patent application is related to U.S. patent application Ser. No. 09/035,821 filed simultaneously, entitled "Telecommunications Inter-Exchange Measurement Transfer", and U.S. patent application Ser. No. 09/036,391 filed simultaneously, entitled "System and Method used in a Mobile Telecommunications Network for Load Balancing Ongoing Calls between Different Base Station", both of which are incorporated herein by reference.

BACKGROUND

1. Field of the Invention

The present invention pertains to cellular telecommunications, and particularly to congestion control in a mobile telecommunications system.

2. Related Art and Other Considerations

In mobile telecommunications, a mobile station (MS) such as mobile telephone communicates over radio channels with base stations. Each base station usually transmits and receives signals over selected radio channels for a particular geographic region known as a cell. The cell often is subdivided into several sectors. Typically a plurality of base stations are connected to a base station controller node, also known as an exchange or a radio network controller node (RNC). One or more RNCs are, in turn, connected to or included with a mobile switching center (MSC). The mobile switching center is usually connected, e.g., via a gateway, to other telecommunication networks, such as the public switched telephone network or to a packet-data network such as the Internet.

FIG. 1 shows a radio access network (RAN) 20 which comprises radio network controllers (RNC) $22_1$ and $22_2$ respectively connected to mobile switching centers (MSC) $24_1$ and $24_2$. Radio network controller (RNC) $22_1$ is connected to base stations (BS) $26_{1,1}$, $26_{1,2}$, and $26_{1,3}$; radio network controller (RNC) $22_2$ is connected to base stations (BS) $26_{2,1}$, $26_{2,2}$, and $26_{2,3}$. The radio network controllers (RNC) $22_1$ and $22_2$ are connected by an inter-RNC transport link 32.

In a code division multiple access (CDMA) mobile telecommunications system, the information transmitted between a base station and a particular mobile station is modulated by a mathematical code (such as spreading code) to distinguish it from information for other mobile stations which are utilizing the same radio frequency. Thus, in CDMA, the individual radio links are discriminated on the basis of codes. Various aspects of CDMA are set forth in Garg, Vijay K. et al., *Applications of CDMA in Wireless/Personal Communications*, Prentice Hall (1997).

In addition, in CDMA mobile communications, typically the same baseband signal with suitable spreading is sent from several base stations with overlapping coverage. The mobile terminal can thus receive and use signals from several base stations simultaneously. Moreover, since the radio environment changes rapidly, a mobile station likely has radio channels to several base stations at the same moment, e.g., so that the mobile station can select the best channel and, if necessary, use signals directed to the mobile from various base stations in order to keep radio interference low and capacity high. This utilization of radio channels to/from multiple base stations by a mobile station, such as occurs in a CDMA scheme for example, is termed "soft handover" or "macro diversity."

At the moment shown in FIG. 1, and for reasons summarized above, mobile station MS is shown in FIG. 1 as having radio communication with two base stations, particularly base stations $26_{1,2}$ and $26_{1,3}$. The lines $28_{1,2}$ and $28_{1,3}$ each represent a communication path. Specifically, line $28_{1,2}$ depicts both the radio channel from mobile station MS to base station BS $26_{1,2}$ and the land line link channel from base station BS $26_{1,2}$ to radio network controller (RNC) $22_1$; line $28_{1,3}$ depicts both the radio channel from mobile station MS to base station BS $26_{1,3}$ and the land line link channel from base station BS $26_{1,2}$ to radio network controller (RNC) $22_1$. In the case of both lines $28_{1,2}$ and $28_{1,3}$, the land line link is connected to a diversity handover unit (DHU) $30_1$ of radio network controller (RNC) $22_1$.

Thus, as depicted with reference to FIG. 1, the mobile connection with mobile station MS potentially utilizes several "legs", each leg being represented by the lines $28_{1,2}$ and $28_{1,3}$ in the case of mobile station MS of FIG. 1. As the overall connection between mobile station MS and any other party is viewed, the diversity handover unit (DHU) $30_1$ serves essentially both to combine and split the different legs utilized by a mobile station. The splitting occurs in the sense that information directed toward the mobile station is directed along the plural parallel legs to differing base stations. Information received from a base station may actually be obtained through several of the legs (e.g., from several base stations), in which sense the diversity handover unit (DHU) $30_1$ serves a combining function. Operations performed by a diversity handover unit are understood, for example, with reference to copending U.S. patent applications Ser. No. 08/979,866, filed Nov. 26, 1997 and entitled "MULTISTAGE DIVERSITY HANDLING FOR CDMA MOBILE TELECOMMUNICATIONS", which is incorporated herein by reference.

FIG. 1 illustrates the simple case in which the different legs of the connection, represented by lines $28_{1,2}$ and $28_{1,3}$, are for base stations BS all of which are connected to radio network controller (RNC) $22_1$. However, should the mobile station MS travel sufficiently to pick up signals from another base station, e.g., into or proximate a cell handled by another base station, such as base station BS $26_{2,1}$, for example, a more complex situation occurs as shown in FIG. 1A.

The situation depicted in FIG. 1A introduces the concept of a border 31 between groups of cells controlled by base stations which are, in turn, controlled by different RNCs. In FIG. 1A, the mobile station MS communicates not only through the leg represented by line $28_{1,3}$, but now also by the leg represented by line $28_{2,1}$. The leg represented by line $28_{2,1}$ includes the radio link between mobile station MS and base station BS $26_{2,1}$, as well as the information pertinent to the mobile connection which is carried over inter-RNC transport link 32.

Thus, in the situation depicted in FIG. 1A, the mobile connection involving mobile station MS employs base stations belonging to differing radio network controllers (RNC). Such situation involves a different type of handover—an inter-RNC soft handover. Inter-RNC soft-handovers are made between two or several RNCs. In the particular situation shown in FIG. 1A, an inter-RNC soft handover is made between radio network controller (RNC) $22_1$, which is also known as the "Source" RNC, and radio network controller (RNC) $22_2$, which is also known as the "Target" RNC. Radio network controller (RNC) $22_1$ is the Source RNC since it has current control of the mobile radio connection. The Target RNC is an RNC, other than the Source RNC, that has, or has been decided to have, base stations utilized by the mobile radio connection.

The inter-RNC transport link 32 which connects the radio network controllers (RNC) $22_1$ and $22_2$ facilitates, e.g., the inter-RNC soft-handovers. Inter-RNC transport link 32 is utilized for the transport of control and data signals between Source RNC $22_1$ and Target RNC $22_2$, and can be either a direct link or a logical link as described, for example, in International Application Number PCT/US94/12419 (International Publication Number WO 95/15665).

International Application Number PCT/FI94/00038 (International Publication Number WO 95/20865) involves border base stations that are connection to two RNCs. When the mobile station becomes connected to at least one border base station, but no base station owned by the source RNC, the inter-RNC handover can occur.

There are inter-exchange handover protocols specified such as GSM Recommendation 09.02 "Mobile Application Part (MAP)" for GSM; IS41 for AMPS/D-AMPS/IS-95; or INHAP for PDC. In the IS-41 specification, for example, inter-exchange transfer is specified for call related signal quality measurements on specified channels. The signal quality measurements is done by a base station controlled from a second exchange, and transferred to a first exchange where the call for a mobile station is controlled. The measurements are carried out only for a specific mobile station and are used for obtaining a list of possible handover cell candidates for the specific mobile station from the second exchange. In this regard, see also International Application Number PCT/US94/12419 (International Publication Number WO 95/15665).

In the particular situation shown in FIG. 1A, the Source RNC $22_1$ has control of the connection with mobile station MS over legs $28_{1,3}$ and $28_{2,1}$. In order to set up the connection involving leg $28_{2,1}$, RNC $22_1$ previously requested radio sources from Target RNC $22_2$. After the radio resources have been requested from Target RNC $22_2$ and allocated by Target RNC $22_2$ to Source RNC $22_1$, there is no means for Target RNC $22_2$ to inform Source RNC $22_1$ that congestion is occurring in the radio network area managed by Target RNC $22_2$, e.g., a cell in which base station BS $26_{2,1}$ is situated. Thus, the Target RNC $22_2$ is not able to comprehensively manage or control congestion in the network region which it manages, in view of allocation of resources to Source RNC $22_1$ for connections controlled by Source RNC $22_1$.

A typical method for congestion control is based on a total power (e.g., interference) determination performed by a base station to which a call is about to be set up. The total power determination involves summing the power received from all mobile stations with which the base station is currently in communication. If the received power does not exceed a threshold, calls are continued. However, if the threshold is exceeded, the connections need to be reconfigured (e.g., change the allowed usage of resources by a connection, queue the connection, terminate the connection, or move the connection).

What is needed therefore, and an object of the invention, is a congestion control technique for managing congestion in a region of a network in which radio resources are utilized by a node in another region of the network.

BRIEF SUMMARY OF THE INVENTION

A telecommunications network has a target exchange which determines a congestion condition in a region supervised by the target exchange, and which sends a congestion message to a source exchange. The source exchange controls at least some connections which utilize radio resources in the region supervised by the target exchange. The congestion message causes the source exchange to adjust at least one connection which it controls in the region supervised by the target exchange.

In a first mode of the invention, the target exchange determines a selected connection to be adjusted in view of the congestion condition. If the selected connection is controlled by the source exchange, in this first mode, the congestion message identifies the selected connection to be adjusted and further includes an adjustment value (e.g., power reduction value) for the selected connection to be adjusted. The source exchange adjusts the selected connections by sending an adjustment message to the mobile station participating in the selected connection, and also advises the target exchange of the adjustment.

In a second mode of the invention, the target exchange uses the congestion message to advise the source exchange of the existence of the congestion. In the second mode, the congestion message includes an identification of a congested area (e.g., a cell) within the region supervised by the target exchange, as well as a severity value indicating a severity of the congestion in the congested area. The severity value can be indicative of a needed decrease in congestion in the congested area. In the second mode, the source exchange determines what connections to adjust, and implements the adjustment by sending an adjustment message to the mobile stations participating in the adjusted connections. In addition, the target exchange is notified of the connections which are adjusted.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4 is a schematic view of an example base station (BS) which operates in accordance with a mode of the present invention.

FIG. 5A is a flowchart showing basic steps included in preparation, transmission, and utilization of a congestion message according to a first mode of the invention.

FIG. 5B is a flowchart showing basic steps included in preparation, transmission, and utilization of a congestion message according to a second mode of the invention.

FIG. 9 is a diagrammatic view of a CONNECTION IDENTITY LIST maintained by a Target RNC node according to a mode of the invention.

FIG. 10 is a diagrammatic view of a CONNECTION VIA TARGET RNC IDENTITY LIST maintained by a Source RNC node according to a mode of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
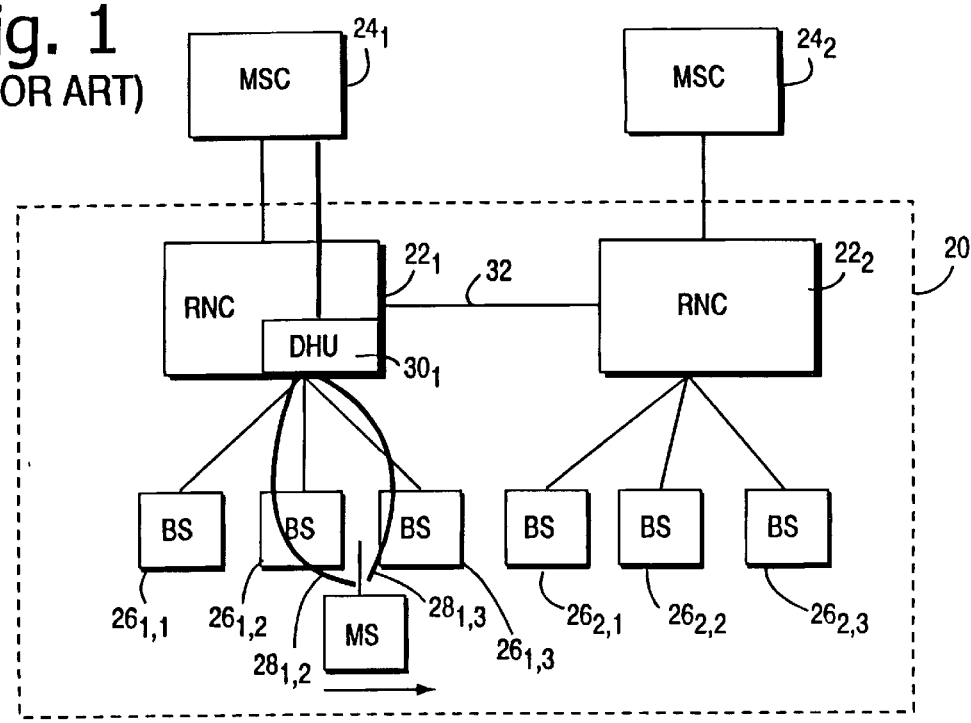
FIG. 1 and FIG. 1A are diagrammatic views showing prior art management of a mobile connection relative to a Source radio network controller and a Target radio network controller.
Figure 1A:
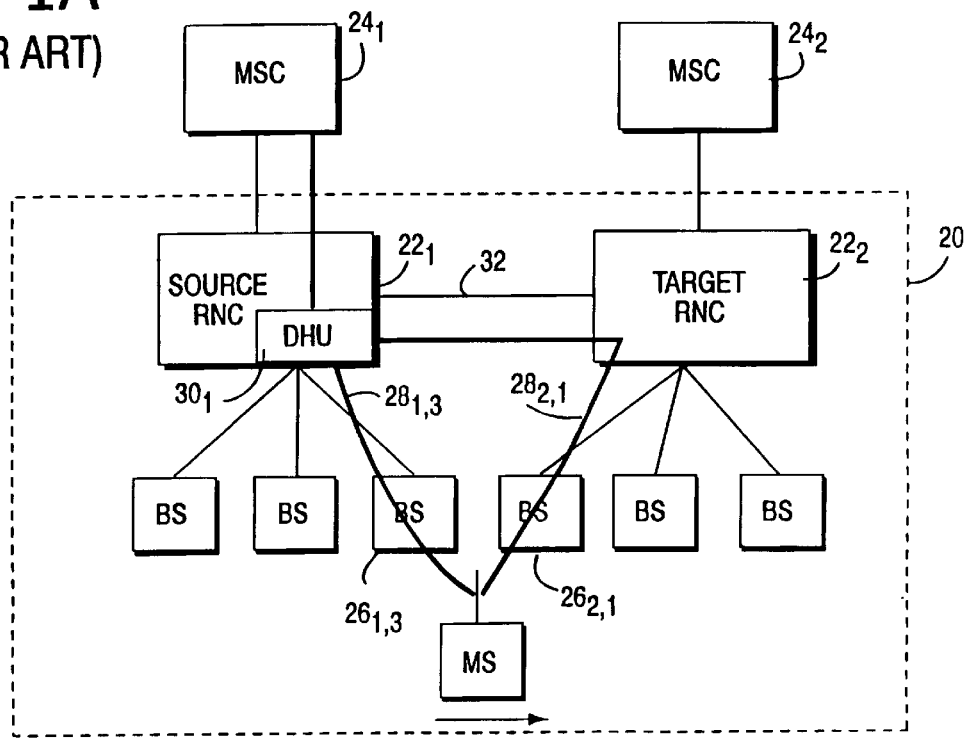
Figure 2:
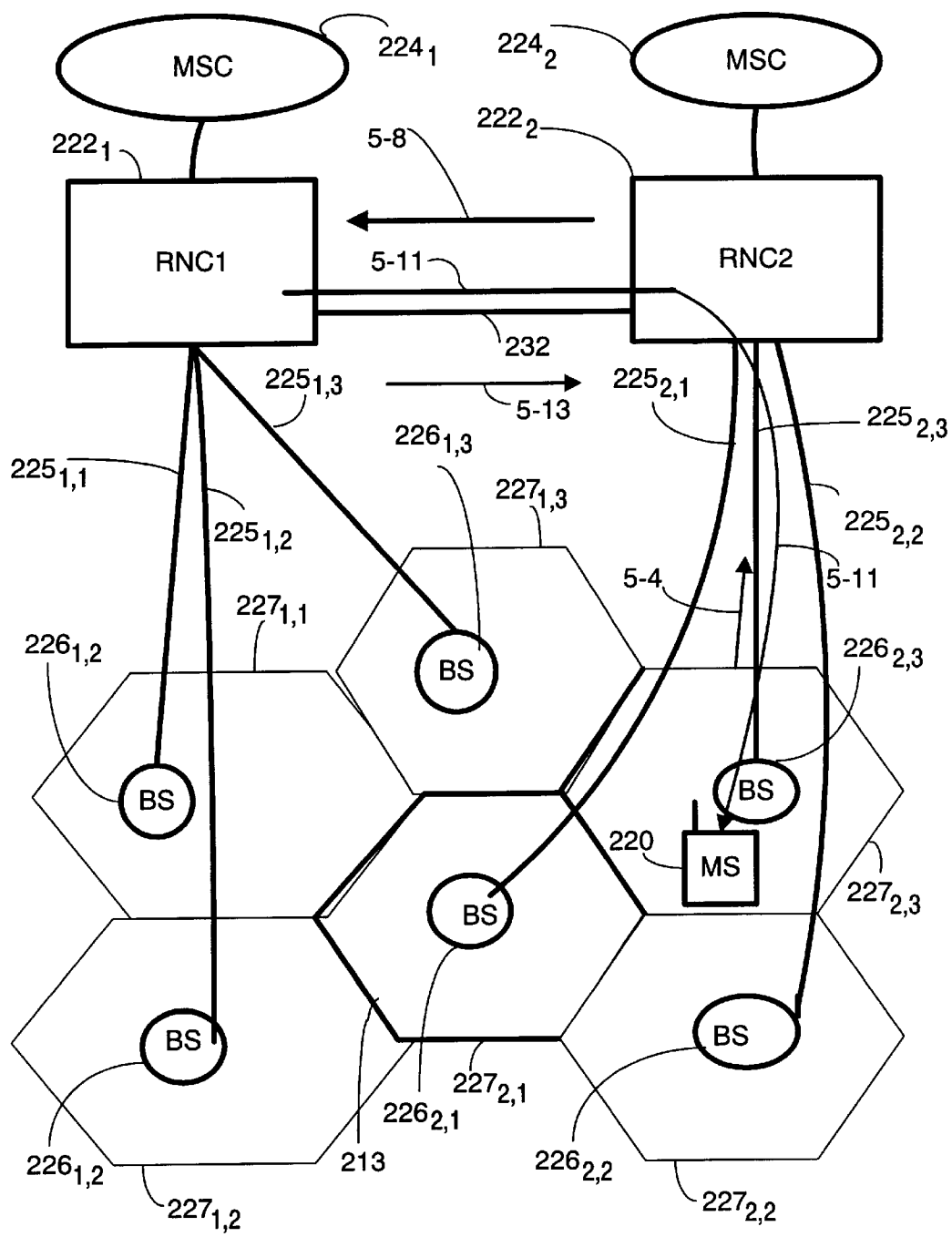
FIG. 2 is a diagrammatic views showing an example radio access network for illustrating a congestion control technique of the present invention.

FIG. 2 shows a radio access network (RAN) 220 which comprises exchanges or radio network controllers (RNC) $222_1$ and $222_2$ respectively connected to mobile switching centers (MSC) $224_1$ and $224_2$. Radio network controller (RNC) $222_1$ is connected via links $225_{1,1}$, $225_{1,2}$, and $225_{1,3}$ to base stations (BS) $226_{1,1}$, $226_{1,2}$, and $226_{1,3}$. Base stations (BS) $226_{1,1}$, $226_{1,2}$, and $226_{1,3}$ serve respective cells $227_{1,1}$, $227_{1,2}$, and $227_{1,3}$. Radio network controller (RNC) $222_2$ is likewise connected via links $225_{2,1}$, $225_{2,2}$, and $225_{2,3}$ to base stations (BS) $226_{2,1}$, $226_{2,2}$, and $226_{2,3}$. Base stations (BS) $226_{2,1}$, $226_{2,2}$, and $226_{2,3}$ serve respective cells $127_{2,1}$, $127_{2,2}$, and $127_{2,3}$. An exchange border 231 is shown as separating a first group of cells served by base stations controlled by radio network controller (RNC) $222_1$ (i.e., cells $227_{1,1}$, $227_{1,2}$, and $227_{1,3}$) and a second group of cells served by base stations controlled by radio network controller (RNC) $222_2$ (i.e., cells $227_{2,1}$, $227_{2,2}$, and $227_{2,3}$). The radio network controllers (RNC) $122_1$ and $122_2$ are connected by an inter-RNC transport link 232.

The radio network controller (RNC) $222_1$ and radio network controller (RNC) $222_2$ can be any type of exchange which hosts radio network control functionality for a number of base stations. As such, radio network controller (RNC) $222_1$ and radio network controller (RNC) $222_2$ can be either distantly located or collocated, and can even be collocated with the mobile switching centers (MSC) 224.

It should also be understood that radio network controller (RNC) $222_1$ and radio network controller (RNC) $222_2$ can be, and likely are, connected to other radio network controllers (RNCs). Accordingly, additional inter-RNC transport links 232 are shown. The inter-RNC transport links 232 can be either direct links or links going via an other exchange, such as an MSC which has the connection with the fixed telephone network.

Figure 3:
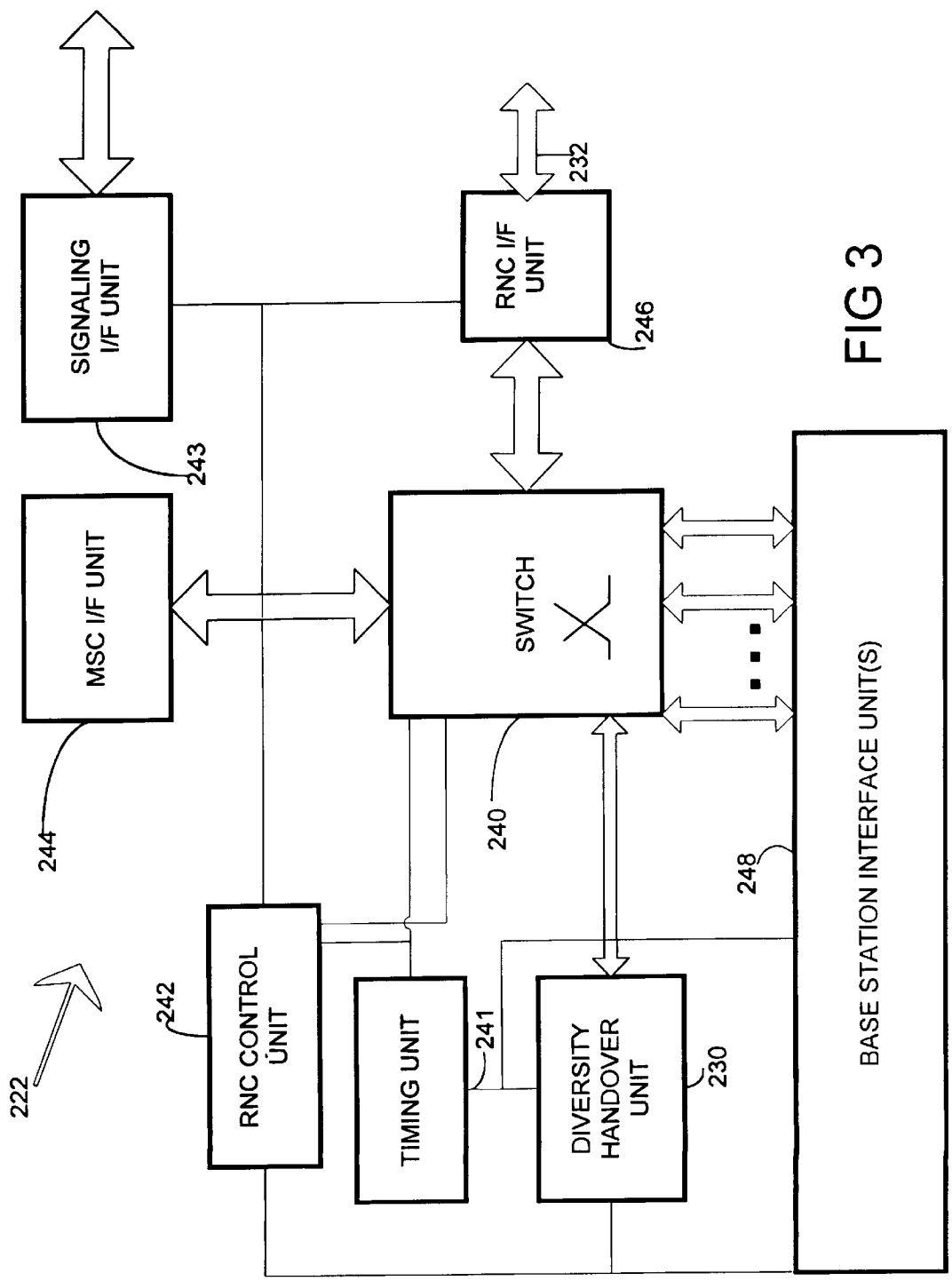
FIG. 3 is a schematic view of an example exchange or radio network controller (RNC) which operates in accordance with a mode of the present invention.

An example radio network controller (RNC) 222 is shown in FIG. 3 as comprising a switch 240. Switch 240, which is controlled by RNC control unit 242, has a plurality of ports, some of which are connected to diversity handover unit (DHU) 230 and others of which are connected to various interfaces. Diversity handover unit (DHU) 230 is connected to a timing unit 241. The RNC control unit 242 is connected to each element of RNC 222. RNC 222 is connected to a signaling network via a signaling interface 243. Signaling interface 243 is connected to RNC control unit 242. The interfaces connected to ports of switch 240 include MSC interface unit 244; RNC interface unit 246; and base station interface units 248. MSC interface unit 244 is connected to the appropriate mobile switching center 224. RNC interface unit 246 is connected to inter-RNC transport link 232. Base station interface units 248 are connected to the set of base stations (BS) served by the RNC 222.

An example base station (BS) 226 is shown in FIG. 4 as comprising a switch 260. Switch 260, which is controlled by base station control unit 262, has a plurality of ports. At least one, and typically several, of the ports of switch 260 are connected to respective transceiver (Tx/Rx) boards 264. Transceiver (Tx/Rx) boards 264 are connected to antennae which are located in the cell served by the base station (BS) 226. Control unit 262 is also connected to ports of switch 260, as is an terminal board 266. It is through terminal board 266 that base station (BS) 226 communications with its radio network controller (RNC) 222, with link 225 being connected between an appropriate base station interface unit 248 of the radio network controller (RNC) 222 (see FIG. 3) and terminal board 266.

In the example of FIG. 4, four transceiver boards (Tx/Rx) $264_1$ through $264_4$ are shown, each being associated with a respective antenna $274_1$ through $274_4$, respectively. Antennae antenna $274_1$ through $274_4$, serve sectors $284_1$ through $284_4$, respectively, of a cell 290. It should be understood that the number of sectors and number of transceiver boards (Tx/Rx) 264 is not critical to the present invention, nor even is sectorization of a cell necessary. Typically a base station has three to six sectors and one to three frequencies (depending on the call capacity to be served by the base station), but the invention is not limited to cell sectorization or use of multiple frequencies.

The particular example embodiments of radio network controller (RNC) 222 shown in FIG. 3 and base station (BS) 224 shown in FIG. 4 happen to be ATM-based nodes. In this regard, both switch 240 of radio network controller (RNC) 222 and switch 260 of base station (BS) 224 are, in the illustrated example embodiments, ATM switches through which ATM cells are directed. It should be understood that the present invention is not limited to the particular architectures of the example radio network controller (RNC) 222 and base station (BS) 224 shown, nor the use of ATM switches, but that other architectures and data transfer techniques can be employed within the scope and spirit of the present invention.

Examples of two modes of congestion control technique of the present invention are now described in the context of the network topology of FIG. 2. In particular, in the example scenario of FIG. 2 mobile station 220 resides in cell $227_{2,3}$ and is in radio frequency contact e.g., with base station BS $226_{2,3}$. The connection with mobile station 220 is controlled by source radio network controller (RNC) $222_1$, which previously had requested radio resources from radio network controller (RNC) $222_2$ when mobile station 220 moved into the region supervised by radio network controller (RNC) $222_2$. As will be described below, radio network controller (RNC) $222_2$ determines that an undesirable degree of congestion is occurring in cell $227_{2,3}$, for which reason under certain circumstances target radio network controller (RNC) $222_2$ prepares a congestion message in accordance with modes of the invention.

In a first mode of the invention, radio network controller (RNC) $222_2$ determines a selected connection to be adjusted in view of the congestion condition in cell $227_{2,3}$. In this first mode (illustrated in more detail by FIG. 5A and FIG. 8A), the congestion message identifies the selected connection to be adjusted and further includes an adjustment value (e.g., power reduction value) for the selected connection to be adjusted. In a second mode of the invention (illustrated in more detail by FIG. 5B and FIG. 8B), the radio network controller (RNC) $222_2$ does not determine what connections controlled by source radio network controller (RNC) $222_1$ are to be adjusted, but instead includes in the congestion message an identification of a congested area (e.g., cell $227_{2,3}$) within the region supervised by radio network controller (RNC) $222_2$, as well as a severity value indicating a severity of the congestion in the congested area.

For the first mode of the invention, step 5A-1 shows the transceiver boards (Tx/Rx) 264 of base station (BS) $226_{2,1}$ measuring (with respect to each frequency) the total power received (over all connections using the frequency) from the various mobile stations with which the transceiver boards (Tx/Rx) 264 are in radio communication. For each frequency, each transceiver board (Tx/Rx) 264 periodically sends a power received message to its BS control unit 262, as indicated by arrow 5A-2 in FIG. 5A. The power received message depicted by arrow 5A-2 includes an identification of the radio frequency reported and an indication of the measure of the received power for that radio frequency (e.g., per frequency). As step 5A-3, BS control unit 262 performs, at regular intervals, a calculation of an average value of the received power (e.g., average interference per frequency) over the interval. Received interference is the same as received power, e.g., the power received at base station (BS) $226_{2,1}$ from all mobile stations with transmissions sufficiently strong to be detected by base station (BS) $226_{2,1}$.

Figure 6:
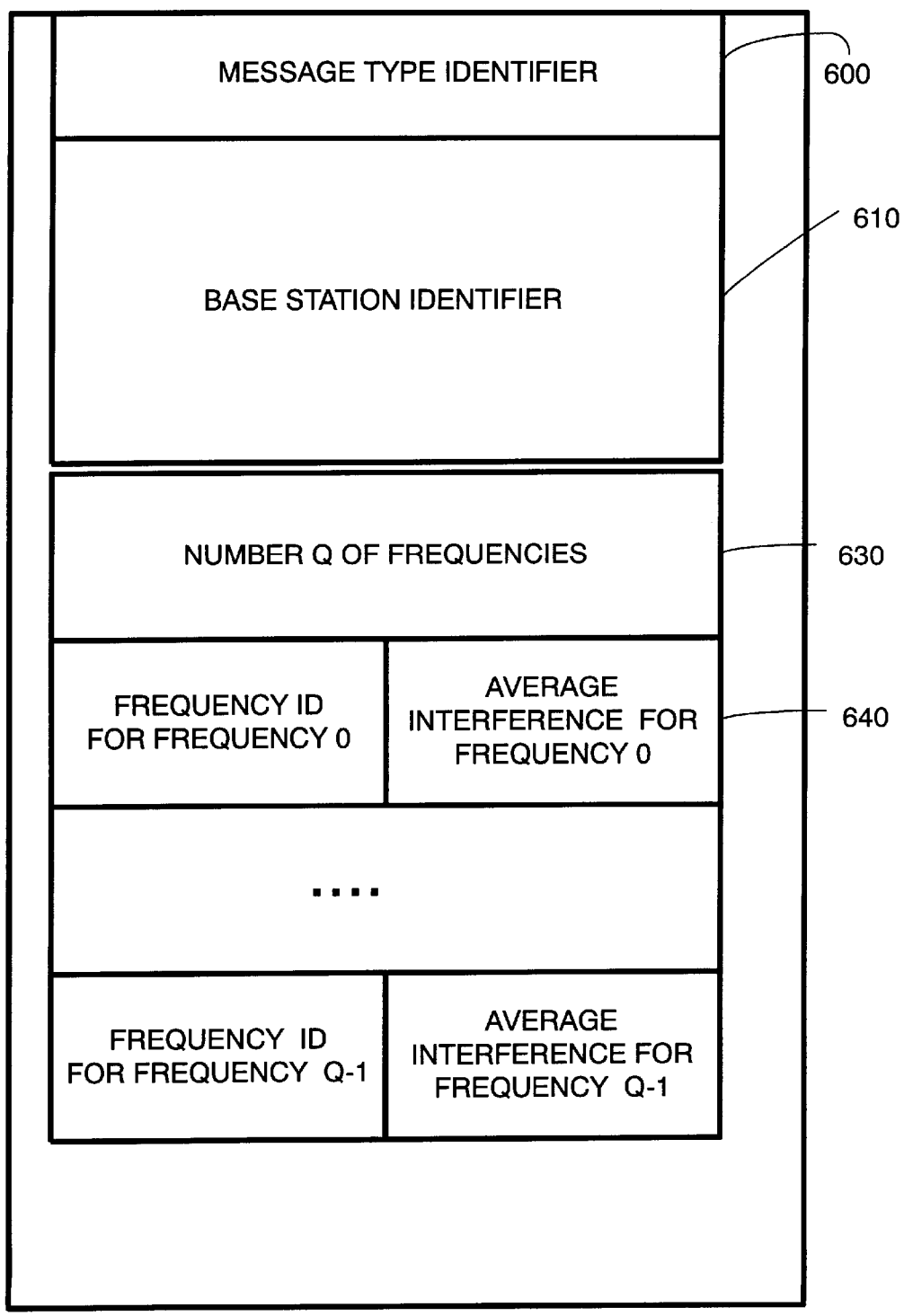
FIG. 6 is a diagrammatic view of an example format for a BS INTERFERENCE MESSAGE according to an embodiment of the present invention.

At the end of each interval, the measurements of average interference values obtained at step 5A-3 are included in a BS INTERFERENCE MESSAGE which has an example format depicted in FIG. 6. As shown in FIG. 6, the BS INTERFERENCE MESSAGE includes the average interference (e.g., power values) for each frequency utilized by base station BS $226_{2,3}$ received at step 5A-1. In particular, FIG. 6 shows the format of the BS INTERFERENCE MESSAGE as including a field for identifying the message as a BS INTERFERENCE MESSAGE (field 600); an identification of the base station node from which BS INTERFERENCE MESSAGE is sent (field 610); a NUMBER Q OF FREQUENCIES presently utilized by base station BS $226_{2,3}$ (field 630); and a set of records for each of the Q frequencies. Each record (e.g., record 640) includes a first field which includes a frequency identifier and a second field which includes the average interference (e.g., uplink power) obtained at step 5A-3 associated with the frequency identified by the first field of the record. If desired, the BS INTERFERENCE MESSAGE can be further formatted on the basis of sector and frequency.

The BS INTERFERENCE MESSAGE is sent from BS control unit 262 of base station (BS) $226_{2,3}$ to radio network controller (RNC) $222_2$ over link $225_{2,1}$. Arrow 5A-4 in FIG. 5A (and more generally arrow 5-4 in FIG. 2) show the transmission of an BS INTERFERENCE MESSAGE sent from base station (BS) $226_{2,3}$ to radio network controller (RNC) $222_2$. Upon receipt, the BS INTERFERENCE MESSAGE is routed through radio network controller (RNC) $222_2$ to its RNC control unit 242. RNC control unit 242 of radio network controller (RNC) $222_2$ receives the BS INTERFERENCE MESSAGES from several, if not all, of the base stations (BS) controlled by radio network controller (RNC) $222_2$.

After it receives the BS INTERFERENCE MESSAGES (e.g., step 5A-4), as shown by step 5A-5 RNC control unit 242 of radio network controller (RNC) $222_2$ determines whether a congestion condition, e.g., an undesirable high degree of interference, exists in cell $227_{2,3}$. Congestion may be detected by comparing the measured interference with a THRESHOLD value. If the measured interference exceeds this THRESHOLD value, there is a congestion condition.

If congestion exists in cell $227_{2,3}$, RNC control unit 242 of target radio network controller (RNC) $222_2$ endeavors at step 5A-6 to reduce congestion below the THRESHOLD by implementing a congestion control routine. A first mode of the congestion control routine is depicted in FIG. 5A and, in more detail, in FIG. 8A.

Prior to discussing the congestion control routines of the invention, as a preliminary matter it is mentioned that RNC control unit 242 of target radio network controller (RNC) $222_2$ maintains, for each cell which it supervises, a CONNECTION IDENTITY LIST such as that shown in FIG. 9. The CONNECTION IDENTITY LIST is employed for, among other things, congestion control, The CONNECTION IDENTITY LIST includes a record for each existing connection in the cell to which the list pertains. Each record has several fields, including a Connection ID field, a Source RNC field, and a Bitrate field, as well as fields for other parameters (such as bit error rate and delay).

Figure 8A:
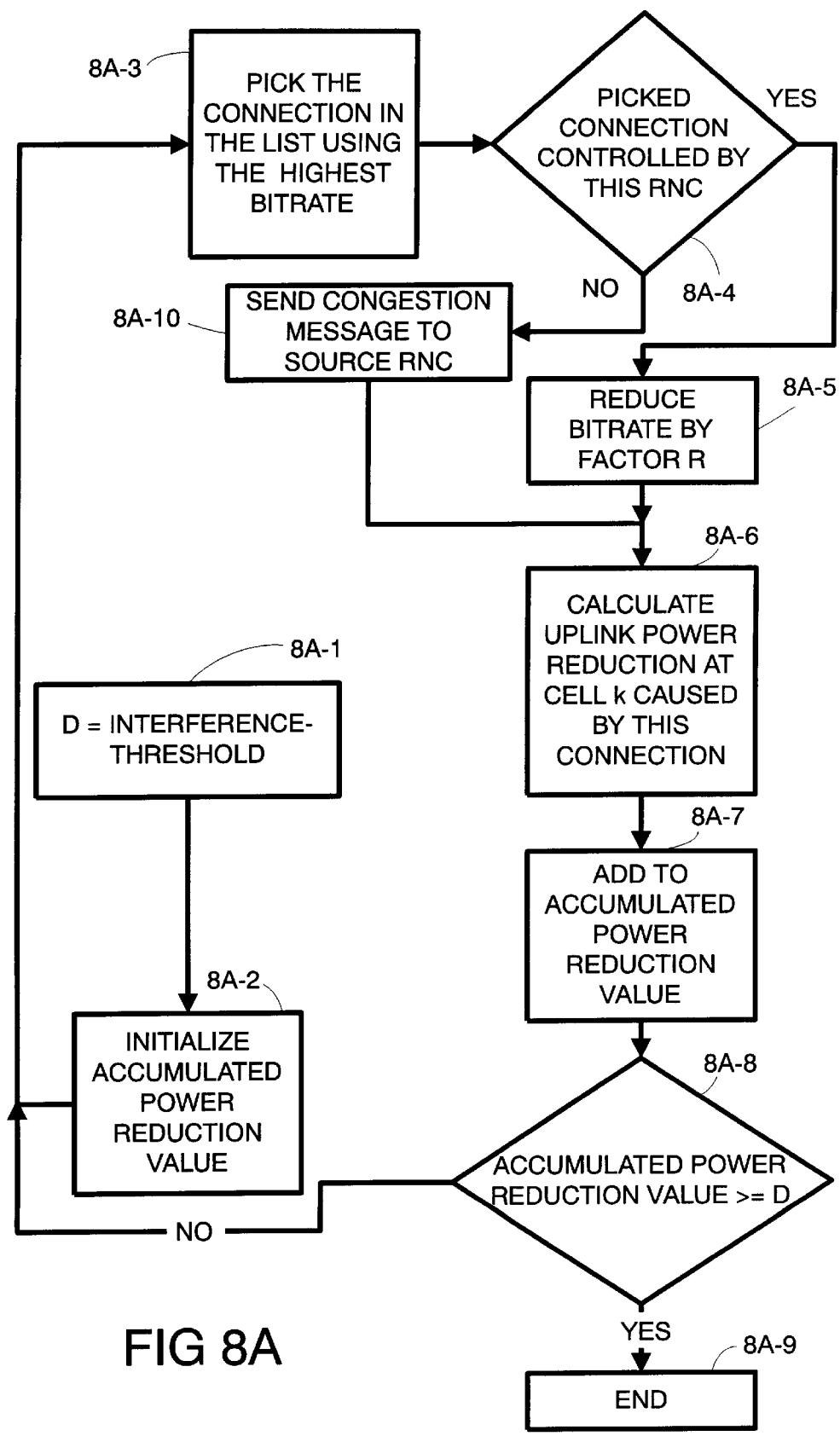
FIG. 8A is a flowchart showing basic steps involved in a congestion control routine in accordance with a first mode of the invention.

FIG. 8A shows operations performed by RNC control unit 242 of radio network controller (RNC) $222_2$ in attempting to reduce congestion in a cell k managed by target radio network controller (RNC) $222_2$ in accordance with the first mode. At step 8A-1 RNC control unit 242 of radio network controller (RNC) $222_2$ determines a difference D between the measured interference value for cell k and the THRESHOLD value. In other words, D=INTERFERENCE−THRESHOLD. An ACCUMULATED POWER REDUCTION VALUE (APRV) is initialized at step 8A-2. The RNC control unit 242 of radio network controller (RNC) $222_2$ then performs a loop comprising step 8A-3 through step 8A-8.

At step 8A-3, RNC control unit 242 of radio network controller (RNC) $222_2$ picks (from the CONNECTION IDENTITY LIST of FIG. 9 for the congested cell) the connection having the highest bitrate. Then it is determined at step 8A-4 whether the connection having the highest bitrate is controlled by target radio network controller (RNC) $222_2$. If the connection having the highest bitrate is controlled by target radio network controller (RNC) $222_2$, the remainder of the loop comprising step 8A-5 through step 8A-8 is performed.

At step 8A-5 the RNC control unit 242 of radio network controller (RNC) $222_2$ reduces the bitrate for the connection picked at step 8A-4. In the illustrated embodiment, the bitrate reduction is by a factor R (e.g., R=2).

At step 8A-6 RNC control unit 242 of radio network controller (RNC) $222_2$ calculates or predicts the uplink power reduction (UPR) for cell k resulting from the reduction of step 8A-5 (the bitrate reduction for the connection having the highest bitrate). This calculation is based on e.g. (1) the distance from the mobile station MS to the base station that controls the cell, and (2) the uplink power used by the particular mobile station MS which had its bitrate (or other parameter) adjusted. This UPR value is added to the ACCUMULATED POWER REDUCTION VALUE (APRV) at step 8A-7. If the ACCUMULATED POWER REDUCTION VALUE (APRV) is greater than or equal to the difference D (see step 8A-1), the congestion in cell k has been satisfactorily reduced for the time being to a tolerable level.

Should ACCUMULATED POWER REDUCTION VALUE (APRV) remain below the difference D as determined at step 5-6-8, the loop of step 8A-3 through step 8A-8 is again performed, this next execution of the loop likely choosing another connection at step 8A-3 as the connection in the CONNECTION IDENTITY LIST of FIG. 9 having the highest bitrate.

If it were determined at step 8A-4 that the connection picked at step 8A-3 from the CONNECTION IDENTITY LIST of FIG. 9 is not controlled by target radio network controller (RNC) 222$_2$, then step 8A-10 is performed. At step 8A-10, RNC control unit 242 of radio network controller (RNC) 222$_2$ prepares a CONGESTION MESSAGE for transmission to source radio network controller (RNC) 222$_1$. Actual transmission of the CONGESTION MESSAGE is shown by arrow 5A-8 in FIG. 5A (and more generally by arrow 5-8 in FIG. 2).

Figure 7A:
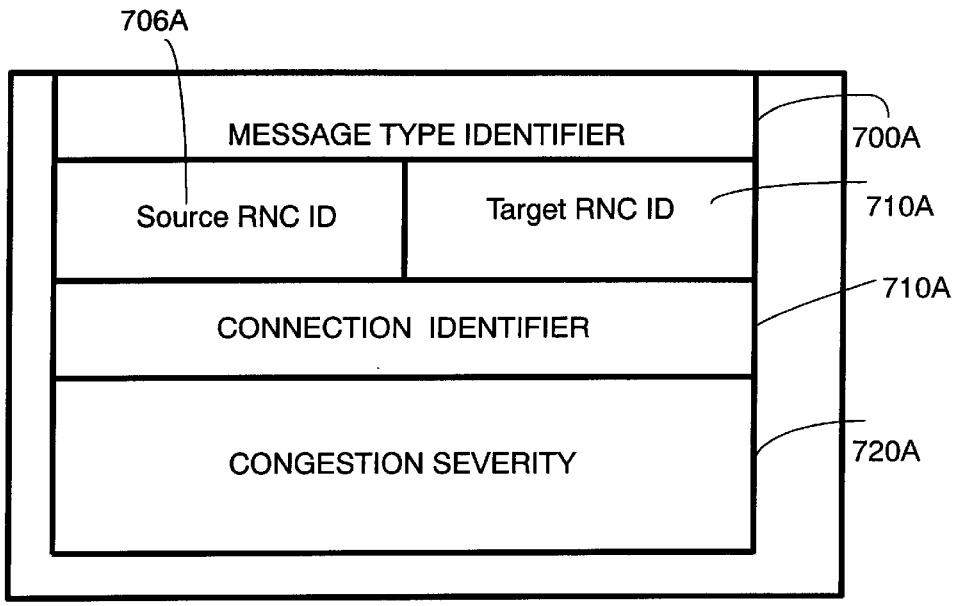
FIG. 7A is a diagrammatic view of an example format for a CONGESTION MESSAGE according to a first mode of the present invention.

A format for an example CONGESTION MESSAGE is according to this first mode of the invention, e.g., FIG. 8A, is shown in FIG. 7A. As shown in FIG. 7A, the CONGESTION MESSAGE of the first mode of the invention includes a message type identification field (field 700A); an identifier of the source RNC 222$_1$ (field 706A); an identifier of the target RNC 222$_2$ (field 707A); an indication of the connection controlled by RNC 222$_1$ which requires adjustment (field 710A); and, a value indicative of the amount of the desired adjustment (e.g., power reduction [e.g., in decibels]) [field 720A]. Such value indicative of the amount of the desired adjustment can be expressed, for example, in terms of a bitrate reduction factor. Other types of values may alternatively be utilized, such as a bit error rate increase factor, or a delay increase factor.

Thus, as shown in FIG. 7A, the CONGESTION MESSAGE identifies the connection (not controlled by radio network controller (RNC) 222$_2$) picked at step 8A-3 from the CONNECTION IDENTITY LIST of FIG. 9 (included in connection identifier field 710A), and further includes the amount of the required adjustment (e.g., the bitrate reduction factor R) in field 720A (see FIG. 7A).

How the CONGESTION MESSAGE reduces congestion in cell k is subsequently described in connection with the remaining steps of FIG. 5A. RNC control unit 242 of radio network controller (RNC) 222$_2$ performs steps 8A-6 through 8A-8. If the sending of the CONGESTION MESSAGE at step 8A-10 results in sufficient reduction in congestion, the congestion control routine of FIG. 8A is exited as indicated by step 8A-9 and (as indicated by arrow 5-7) RNC control unit 242 of radio network controller (RNC) 222$_2$ returns to step 5A-5 for further congestion monitoring. If the degree of congestion has not yet been successfully reduced, the loop of FIG. 8A comprising steps 8A-3 through 8A-8 is repeated until the congestion is sufficiently reduced.

It should be understood from the discussion of the first mode of congestion control, particularly as illustrated in FIG. 8A, that a series of CONGESTION MESSAGES may be issued from RNC control unit 242 of radio network controller (RNC) 222$_2$ (e.g., during repeated execution of step 8A-10) until congestion is satisfactorily reduced. On the other hand, as a variation on the first mode of congestion control, the RNC control unit 242 of radio network controller (RNC) 222$_2$ can instead delay temporarily and prepare a single CONGESTION MESSAGE which identifies several connections. In this regard, after determining that a first RNC 222$_1$-controlled connection needs to be adjusted, the RNC control unit 242 of radio network controller (RNC) 222$_2$ can also determine an ESTIMATED ACCUMULATED POWER REDUCTION VALUE (EAPRV) eventually to be achieved by the adjustment, and based on a sum of the actual ACCUMULATED POWER REDUCTION VALUE (APRV) and ESTIMATED ACCUMULATED POWER REDUCTION VALUE (EAPRV), determine whether there is a need to repeat a loop of steps similar to those shown in FIG. 8A. If the sum is not deemed sufficient to reduce congestion, further connections are picked from the CONNECTION IDENTITY LIST of FIG. 9. If one of those connections is a second RNC 222$_1$-controlled connection, the ESTIMATED ACCUMULATED POWER REDUCTION VALUE (EAPRV) is updated. Once the RNC control unit 242 of radio network controller (RNC) 222$_2$ determines that the sum of the actual ACCUMULATED POWER REDUCTION VALUE (APRV) (for RNC 222$_2$-controlled connections) and the ESTIMATED ACCUMULATED POWER REDUCTION VALUE (EAPRV) exceeds or equals the difference D, a single CONGESTION MESSAGE is transmitted (also depicted by arrow 5-8 in FIG. 5) to radio network controller (RNC) 222$_1$. Such CONGESTION MESSAGE identifies the number of RNC 222$_1$-connections requiring adjustment; identifies the specific RNC 222$_1$-connections requiring adjustment; and provides the adjustment amounts for each such connection. In this alternative, the CONGESTION MESSAGE of FIG. 7A is thus modified to indicate the number of connections involved in the CONGESTION MESSAGE, with paired fields 710A and 710B being provided for each such connection.

Discussion now continues with the reception, general processing, and effect of a CONGESTION MESSAGE according to the first mode of the invention. Upon receipt of the CONGESTION MESSAGE, the CONGESTION MESSAGE is routed through source radio network controller (RNC) 222$_1$ to its RNC control unit 242. At step 5A-9 the RNC control unit 242 of radio network controller (RNC) 222$_1$ then adjusts the parameters for the connections which require adjustment. For the first mode represented by FIG. 8A, the connections requiring adjustment were identified by RNC control unit 242 of radio network controller (RNC) 222$_2$ (see step 8A-3 in FIG. 8A). The parameters which are adjusted can be, for example, a bitrate reduction factor, a bit error rate increase factor, or a delay increase factor.

The remainder of the steps shown in FIG. 5A show implementation of a congestion control adjustment for one mobile station 220. It should be understood that RNC control unit 242 of radio network controller (RNC) 222$_1$ may perform the remaining steps of FIG. 5A for plural mobile stations.

After making the adjustment at step 5A-9, at step 5A-10 RNC control unit 242 causes radio network controller (RNC) 222$_1$ to prepare a MS ADJUSTMENT MESSAGE which is transmitted (represented by arrow 5A-11) to the mobile station involved in the adjusted connection. As depicted by arrow 5-11 in FIG. 2, the MS ADJUSTMENT MESSAGE is routed through the DHU of source radio network controller (RNC) 222$_1$, over Inter-RNC link 232 to target radio network controller (RNC) 222$_2$, through the base station, and to the mobile station (as indicated by step 5A-12). Upon receipt of the MS ADJUSTMENT MESSAGE with the lowered bitrate, the mobile station 220 lowers its bitrate.

As shown by step 5A-12, RNC control unit 242 causes radio network controller (RNC) 222$_1$ also to prepare a Target RNC ADJUSTMENT MESSAGE which is transmitted (represented by arrow 5A-13 in FIG. 5A and more generically as arrow 5-13 in FIG. 2) to target radio network controller (RNC) $222_2$. For the connection which was adjusted by the companion MS ADJUSTMENT MESSAGE, at step 5A-14 the Target RNC ADJUSTMENT MESSAGE updates the Bitrate field in the CONNECTION IDENTITY LIST of FIG. 9 maintained by the RNC control unit 242 of target radio network controller (RNC) $222_2$.

It has been explained above how, in the congestion control technique of the first mode, target radio network controller (RNC) $222_2$ determines what connections controlled by source radio network controller (RNC) $222_1$ require adjustment, and advises source radio network controller (RNC) $222_1$ accordingly with a CONGESTION MESSAGE. The source radio network controller (RNC) $222_1$ makes the adjustments, and sends the MS ADJUSTMENT MESSAGE and the Target RNC ADJUSTMENT MESSAGE accordingly. The MS ADJUSTMENT MESSAGE causes mobile station 220 to reduce its power, which helps alleviate the congestion occurring in cell $227_{2,3}$.

The second mode of the invention as shown in FIG. 5B has steps 5B-1 through 5B-5 which are essentially identical to step 5A-1 through step 5A-5, respectively, of the first mode (FIG. 5A). However, the second mode of the invention differs in the implementation of its particular congestion control routine (depicted as step 5B-6) performed by RNC control unit 242 of radio network controller (RNC) $222_2$, since the RNC control unit 242 of radio network controller (RNC) $222_2$ does not select connections controlled by Source RNC for adjustment, but instead alerts the Source RNC of the fact and degree of congestion. In this regard, in the second mode of the invention, the congestion message does not include an identification of selected connection, but instead an identification of a congested area (e.g., cell $227_{2,3}$) within the region supervised by radio network controller (RNC) $222_2$, as well as a severity value indicating the interference reduction (in dB) from the Source RNC that is needed in the congested cell. Moreover, the second mode of the invention has steps 5B-9A and 5B-9B instead of step 5A-9, since the RNC control unit 242 of radio network controller (RNC) $222_1$ selects the connections to be adjusted.

Figure 8B:
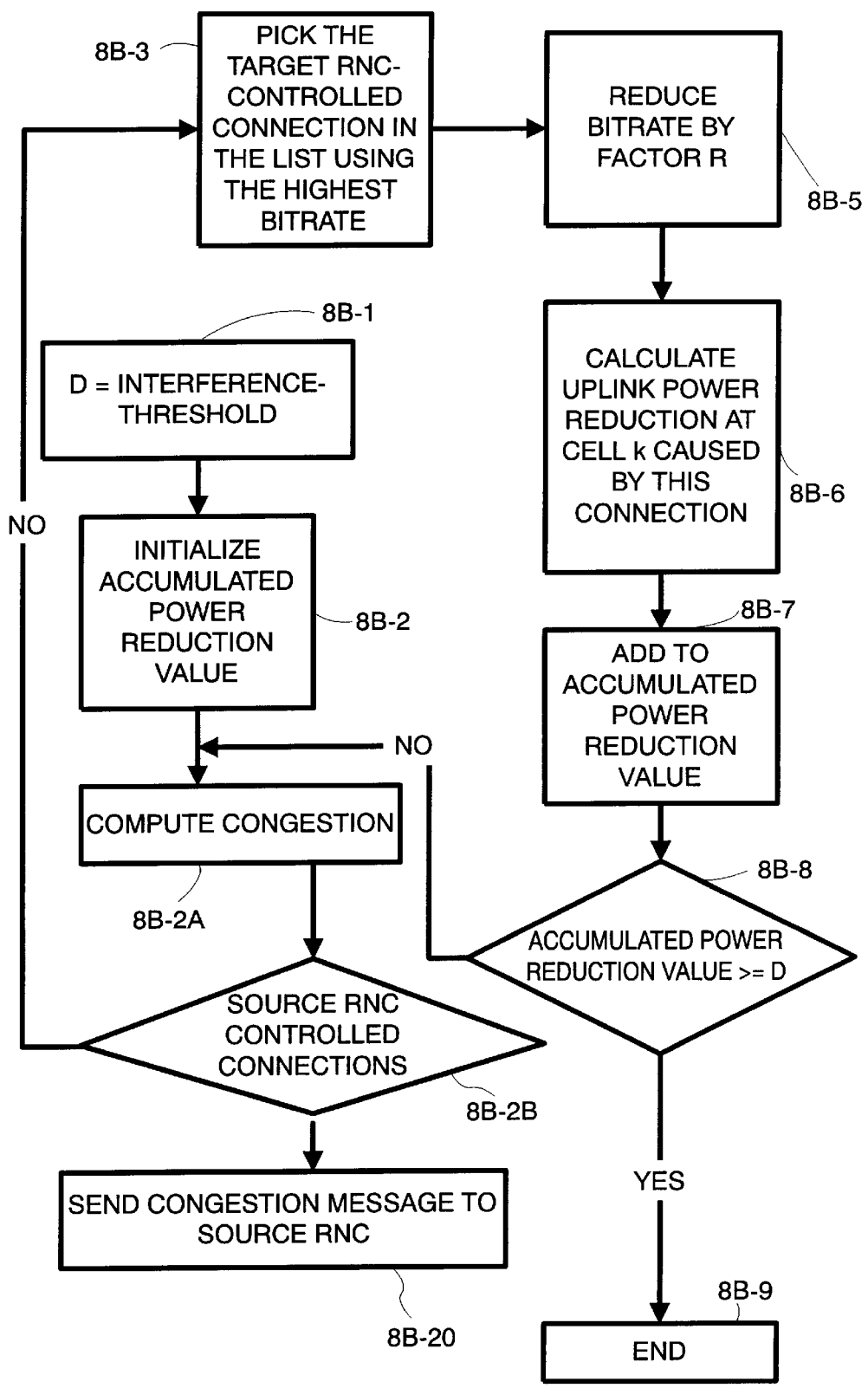
FIG. 8B is a flowchart showing basic steps involved in a congestion control routine in accordance with a second mode of the invention.

FIG. 8B shows in more detail the congestion control routine of the second mode as generally depicted by step 5B-6 of FIG. 5B. Steps 8B-1 and 8B-2 of the second mode are similar to correspondingly enumerated steps 8A-1 and 8A-2 of the first mode, e.g., computation of the differential D and initialization of the ACCUMULATED POWER REDUCTION (APRV). In contrast to the first mode, the second mode includes step 8B-2A and step 8B-2B. At step 8B-2A, the RNC control unit 242 of radio network controller (RNC) $222_2$ determines the congestion severity. At step 8B-2B, the RNC control unit 242 of radio network controller (RNC) $222_2$ determines whether congestion control at this juncture is to involve Target RNC-controlled connections or Source RNC-controlled connections extending into cell k.

In the case that Target RNC-controlled connections are to be adjusted to alleviate congestion, steps 8B-3 through 8B-8 are performed by RNC control unit 242 of radio network controller (RNC) $222_2$. At step 8B-3 the RNC control unit 242 of radio network controller (RNC) $222_2$ picks, from the CONNECTION IDENTITY TABLE of FIG. 9, the connection controlled by the Target RNC (e.g., radio network controller (RNC) $222_2$) which currently uses the highest bitrate. The connections controlled by the Source RNC (e.g., radio network controller (RNC) $222_1$) are not involved in the determination of step 8B-3). After picking a Target RNC-controlled connection to reduce, RNC control unit 242 of radio network controller (RNC) $222_2$ performs steps 8B-5 through 8B-8, which are comparable to similarly numbered steps 8A-5 through 8A-8, respectively. In this regard, at step 8B-5 the bitrate of the picked connection is reduced by the factor R. At step 8B-6 the uplink power reduction in cell k caused by this connection is calculated, and at step 8B-7 the reduction of step 8B-6 is added to the ACCUMULATED POWER REDUCTION VALUE (APRV). Then, at step 8B-9, like at step 8A-9, it is determined whether the ACCUMULATED POWER REDUCTION VALUE (APRV) equals or exceeds the differential D (i.e., that congestion has been sufficiently reduced).

If congestion has been sufficiently reduced as determined at step 8B-8, the congestion control routine of the second mode is exited as represented by step 8B-9. On the other hand, if congestion is not sufficiently reduced, the RNC control unit 242 of radio network controller (RNC) $222_2$ returns to step 8B-2A for a recomputation of congestion, followed by a further evaluation at step 8B-2B whether Target RNC-controlled connections or Source RNC-controlled connections are to be adjusted. As explained below, the decision at step 8B-2B may change from Target RNC-controlled connections to Source RNC-controlled connections.

If it is determined at step 8B-2B that Source RNC-controlled connections are to be adjusted, at step 8B-20 the RNC control unit 242 of radio network controller (RNC) $222_2$ sends a CONGESTION MESSAGE (having the format of FIG. 7B) to radio network controller (RNC) $222_1$. The format of the CONGESTION MESSAGE of FIG. 7B and the operation of radio network controller (RNC) $222_1$ upon reception thereof are discussed below.

Thus, the second mode differs from the first mode in not involving connections controlled by the Source RNC in the connection picking step 8B-3. The second mode also differs from the first mode in that RNC control unit 242 of radio network controller (RNC) $222_2$ can, at any point, choose between Source RNC-controlled connections and Target RNC-controlled connections for reduction. A switch from adjusting Target RNC-controlled connections to adjusting Source RNC-controlled connections (as implemented by the transmission of a CONGESTION MESSAGE according to the second mode) can be triggered by any of several criteria. For an example of one type of criteria, the switch resulting in transmission of the CONGESTION MESSAGE of the second mode can be triggered by the Target RNC having adjusted all of the Target RNC-controlled connections above a predetermined power level, but without successfully reducing congestion. A second example of such criteria is the Target RNC having adjusted a predetermined number of its Target RNC-controlled connections.

Figure 7B:
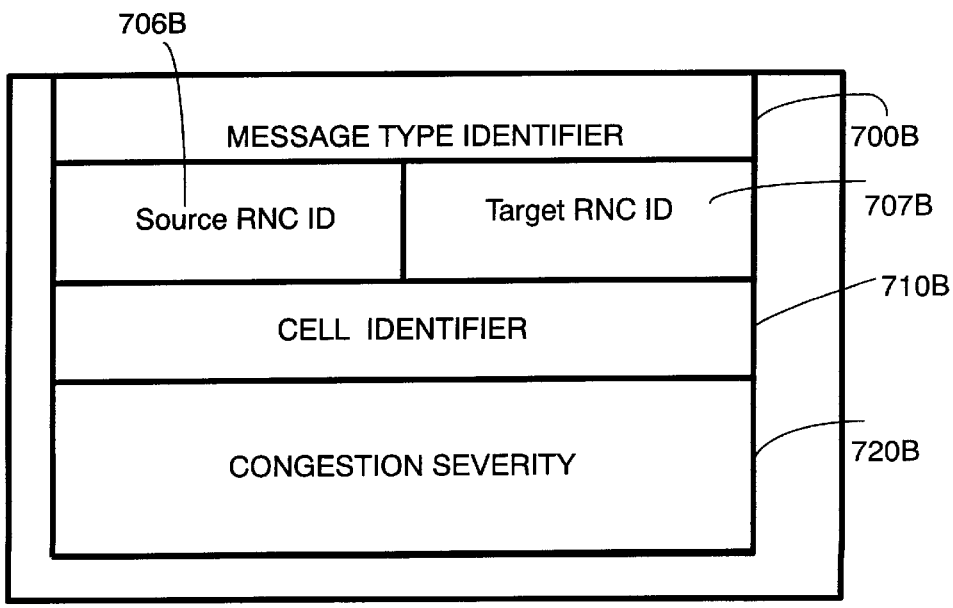
FIG. 7B is a diagrammatic view of an example format for a CONGESTION MESSAGE according to a second mode of the present invention.

As shown in FIG. 7B, the CONGESTION MESSAGE of the second mode of the invention includes a message type identification field (field 700B); an identifier of the source RNC $222_1$ (field 706B); an identifier of the target RNC $222_2$ (field 707B); an indication of a cell which requires adjustment (field 710B); and, a value indicative of the severity of the congestion [field 720B] (i.e., the interference reduction (in dB) from the Source RNC that is needed in the congested cell). In the example scenario above described, the CONGESTION MESSAGE would pertain to cell $227_{2,3}$ in which congestion is occurring.

It should be understood that, in other embodiments, the CONGESTION MESSAGE can include reference to more than one cell. In such other embodiment, for example, a number of cells can be specified, and for each cell there be provided a cell identifier as well as a desired adjustment amount.

Upon reception at source radio network controller (RNC) $222_1$, the CONGESTION MESSAGE is routed through switch 240 to RNC control unit 242 of radio network controller (RNC) $222_1$. The RNC control unit 242 of radio network controller (RNC) $222_1$, being alerted to occurrence of congestion in the cell identified in field 710B, as step 5B-9A for the second mode, determines what connections in that cell, controlled by source radio network controller (RNC) $222_1$, should be adjusted. In so doing, radio network controller (RNC) $222_1$, which is the Source RNC, consults a CONNECTION VIA TARGET RNC IDENTITY LIST which it maintains.

An example format of a representative CONNECTION VIA TARGET RNC IDENTITY LIST is shown in FIG. 10. In particular, each record of the CONNECTION VIA TARGET RNC IDENTITY LIST has several fields, including a Connection ID field, a Target RNC field, a Cell ID field, a Bitrate field, a Bit Error Rate field, and a Delay field. In much the same manner as radio network controller (RNC) $222_2$ sought to adjust the connections which it controlled in steps 8B-3 through 8B-8 of FIG. 8, the RNC control unit 242 of radio network controller (RNC) $222_1$ picks one or more connections from CONNECTION VIA TARGET RNC IDENTITY LIST of FIG. 10 having the highest bitrate and which can be adjusted in order to lessen the congestion severity in cell k. RNC $222_1$ can calculate or predict a rough figure of the expected reduced uplink interference in the congested cell. This calculation can be based, e.g., on (1) the distance between the cells, or from the mobile station MS to the base station that controls the congested cell, and (2) the uplink power used by the particular mobile station MS whose bitrate (or other parameter) was adjusted.

After determining at step 5B-9A what connections in cell $227_{2,3}$ should be adjusted, at step 5B-9B RNC control unit 242 of radio network controller (RNC) $222_1$ adjusts the parameters in much the same manner above described with respect to the second mode. Then, accordance with the adjusted parameters, at step 5B-10 sends a MS ADJUSTMENT MESSAGE to mobile station 220 and at step 5B-12 sends an Target RNC ADJUSTMENT MESSAGE to target radio network controller (RNC) $222_2$, both in like manner as above discussed with respect to the first mode.

As a variation of the second mode, the RNC control unit 242 of radio network controller (RNC) $222_2$ can perform steps much akin to FIG. 8A rather than FIG. 8B, and in so doing at step 8A-10 send the CONGESTION MESSAGE of FIG. 7B rather than the congestion message of FIG. 7A.

In the second mode, the CONGESTION MESSAGE is sent from any Target RNC that has a congested cell, to every RNC that may acts as a Source RNC. The target RNC has a list of RNCs that may act as a Source RNC for connections using radio resources managed by the target RNC.

Thus, in accordance with the congestion control techniques of the present invention, a CONGESTION MESSAGE is sent between exchanges, e.g., RNC nodes, when congestion occurs in a cell supervised by one exchange (e.g., RNC $222_2$) but for which radio resources have been allocated by another exchange (e.g., RNC $222_1$). The CONGESTION MESSAGE can be sent over a common channel signalling link of a signalling network or as in-band signalling. The CONGESTION MESSAGE can be sent individually for each of a number of connections to mobile stations, or can alternatively include congestion indications for plural connections.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications network having a target exchange which determines a congestion condition in a region supervised by the target exchange, and which sends a congestion message to a source exchange, the source exchange controlling connections with mobile stations which utilize radio frequency resources in the region supervised by the target exchange, which congestion message causes the source exchange to adjust at least one connection with a mobile station which it controls in the region supervised by the target exchange.

2. The telecommunications network of claim 1, wherein the target exchange determines a selected connection to be adjusted in view of the congestion condition, and wherein the congestion message identifies the selected connection to be adjusted.

3. The telecommunications network of claim 2, wherein the congestion message includes an adjustment value for the selected connection to be adjusted.

4. The telecommunications network of claim 3, wherein the adjustment value for the selected connection is a power reduction value.

5. The telecommunications network of claim 2, wherein the congestion message identifies plural selected connections to be adjusted.

6. The telecommunications network of claim 1, wherein the congestion message includes an identification of a congested area within the region supervised by the target exchange.

7. The telecommunications network of claim 6, wherein the congested area is a cell.

8. The telecommunications network of claim 6, wherein the congestion message includes an identification of plural congested areas within the region supervised by the target exchange.

9. The telecommunications network of claim 6, wherein the congestion message includes a severity value indicating a severity of the congestion in the congested area.

10. The telecommunications network of claim 9, wherein the severity value is indicative of a needed decrease in congestion in the congested area.

11. A method of operating a telecommunications network comprising:
   determining, at a target exchange, a congestion condition in a region supervised by the target exchange;
   preparing and sending from the target exchange a congestion message to a source exchange, the source exchange controlling connections with mobile stations which utilize radio frequency resources in the region supervised by the target exchange;
   the source exchange responding to the congestion message to adjust at least one connection with a mobile station which the source exchange controls in the region supervised by the target exchange.

12. The method of claim 11, further comprising:
   determining, at the target exchange, a selected connection to be adjusted in view of the congestion condition; and
   including in the congestion message an identification of the selected connection to be adjusted.

13. The method of claim 12, further comprising including in the congestion message an adjustment value for the selected connection to be adjusted.

14. The method of claim 13, wherein the adjustment value for the selected connection is a power reduction value.

15. The method of claim 12, comprising including in the congestion message plural selected connections to be adjusted.

16. The method of claim 11, comprising including in the congestion message an identification of a congested area within the region supervised by the target exchange.

17. The method of claim 16, wherein the congested area is a cell.

18. The method of claim 16, further comprising including in the congestion message an identification of plural congested areas within the region supervised by the target exchange.

19. The method of claim 16, further comprising including in the congestion message a severity value indicating a severity of the congestion in the congested area.

20. The method of claim 19, wherein the severity value is indicative of a needed decrease in congestion in the congested area.

* * * * *